United States Patent [19]

Kegel et al.

[11] Patent Number: 4,580,731
[45] Date of Patent: Apr. 8, 1986

[54] CENTER PIVOT IRRIGATION SYSTEM CONTROL

[75] Inventors: Richard L. Kegel; Thomas R. Steury, both of Bellevue, Wash.

[73] Assignee: Desert Rain Irrigation Co., Pasco, Wash.

[21] Appl. No.: 595,419

[22] Filed: Mar. 30, 1984

[51] Int. Cl.$^4$ ............................................... B05B 3/18
[52] U.S. Cl. ...................................... 239/710; 239/720
[58] Field of Search ............ 239/720, 710, 719, 177.1, 239/177.2

[56] References Cited

U.S. PATENT DOCUMENTS

| | | | |
|---|---|---|---|
| 3,823,730 | 7/1974 | Sandstrom et al. | 239/720 X |
| 3,952,769 | 4/1976 | Ott | 239/720 X |
| 4,073,309 | 2/1978 | Fraser et al. | 239/720 |
| 4,434,936 | 3/1984 | Chapman et al. | 239/710 X |

*Primary Examiner*—Jeffrey V. Nase
*Assistant Examiner*—Daniel R. Edelbrock
*Attorney, Agent, or Firm*—Kolisch, Hartwell & Dickinson

[57] ABSTRACT

A control apparatus is disclosed for use in an irrigation system having a plurality of conduit sections pivotally joined at sets of adjacent ends and selectively operable drivers for moving the conduit sections in a forward direction. Each control apparatus maintains the relative alignment of a pair of joined conduit sections. It includes a conduit misalignment indicator having two indicating portions which are directly relatable in position to the relative alignment of the two conduit sections. Further, Hall-effect sensors positioned on one indicating portion opposite from a magnet positioned on the other indicating portion provide for sensing of the relative alignment of the conduit sections. A digital electrical circuit converts the sensor signals into a control signal for initiating operation of the driver when the conduit sections are in lagging misalignment and terminating operation when the conduit sections are in leading misalignment. The apparatus may be used with a direction indicator to initiate operation of the driver when the conduit misalignment exists for the given direction of travel. Also, the two indicating portions may be disposed on a misalignment multiplier which increases the sensitivity of the apparatus to the relative alignment of the two associated conduit sections. Time delayed circuitry is also provided for terminating operation of the irrigation system when the conduit sections are in excessive misalignment.

6 Claims, 7 Drawing Figures

CENTER PIVOT IRRIGATION SYSTEM CONTROL

BACKGROUND OF THE INVENTION

This invention pertains to apparatus for controlling an irrigation system having a self-propelled distribution line including conduit sections pivotally joined in end-to-end alignment and drivers for driving the sections. More specifically, it pertains to such a control apparatus having conduit misalignment indicators connectable to a pair of joined conduit sections, sensors mounted on the indicators for generating electrical signals indicative of the relative alignment of the associated conduit sections, and a circuit responsive to the sensor signals for generating a control signal for controlling operation of the driver.

Although the present invention may be used with other types of alignment control applications, it is particularly intended for use in a self-propelled sprinkler irrigation system having a plurality of end-coupled irrigation conduits which pivot collectively about a central point. Each of the sections is supported by a tower having a motorized driver which rotates the irrigation line around the center pivot point. As is apparent, the outer towers must travel relatively further than the inner towers.

Each of the towers is normally supported on wheeled carriages which are driven by reversible electric motors. In order to provide a controlled uniform water distribution it is important that the conduit sections be maintained in substantial linear alignment.

A center-pivot system typically substantially continuously drives the outermost conduit tower. The less distant towers are then driven intermittently as required to maintain the irrigation line in alignment.

In such linear irrigation systems, a conduit tower remains in a position until the two associated joined conduit sections indicate that the tower has assumed a lagging position. The tower motor is energized to drive the tower to bring the conduit sections into either an aligned position or into a leading misaligned position. The motor is then turned off to let the tower again stand until it is in a lagging position. Following this procedure for all of the conduit sections, the overall system is maintained in general alignment.

Various control apparatus have been developed to detect the relative alignment of adjacent conduit sections and, thereby, the relative position of an associated tower. One such system uses a strain gauge mounted on a bar which extends between the ends of adjacent conduit sections and is fixedly fastened to the sections. The amount of bend sensed by the strain gauge provides an analog determination of relative alignment. This however, requires that potentiometers used in the apparatus be adjusted to compensate for changes in values caused by temperature changes.

Another control system is disclosed in a patent to Sandstrom et. al., U.S. Pat. No. 3,823,730, entitled "Alignment Control System". In this system a pair of photodiodes and photosensors are attached to one conduit section and a shield attached to the other section. As the two pipe sections move out of alignment the shield shifts away from the photosensors, allowing them to function. Alternatively, a potentiometer sensor may be used which provides an analog signal indicative of the relative alignment of the two conduit sections.

Another type of control apparatus is disclosed in the patent to Fraser et. al., U.S. Pat. No. 4,073,309, entitled "Irrigation Apparatus" which discloses the use of a magnetic reed switch and a permanent magnet which again has a movable shield interposed them which is attached to a different conduit section than the reed switch/magnet combination. This system includes one reed switch to indicate when misalignment occurs regardless of the direction and a second reed switch which indicates when there is excessive misalignment. This system activates the motors when misalignment occurs on the presumption that misalignment has occurred in a lagging direction. The driver is operated until the system returns to alignment.

The use of analog-type control apparatus, such as the strain gauge or potentiometer, typically have problems because the values of critical circuit components, particularly resistors, vary with changes in ambient temperature. Thus, they must be readjusted often. Further, these apparatus operate to varying degrees of sensitivity depending on the condition of the components. The apparatus discussed in Fraser et. al. only has a single sensor which indicates alignment or misalignment so that the direction of misalignment is not directly determined. When it is operated the associated tower is brought into alignment and then stopped.

It is therefore, desirable to have digital electronic controllers which are generally insensitive to variations in values of circuit components. Such a system is disclosed in the previously mentioned patent to Sandstrom et. al. However, this system uses photodetectors which are shielded when the conduit sections are in alignment. This system therefore produces an indication of alignment when there is a failure of the photodiodes associated with the apparatus to conduct. Further, environmental contaminants such as dust can interfere with the proper operation of such a system by blocking the light path. This system also provides for direct connection of the sensing elements to associated conduit sections. The sensitivity of such controllers is limited by the physical size of the actual sensors used.

SUMMARY OF THE INVENTION

It is therefore a principal object of the present invention to provide a new and improved control system for maintaining the alignment of adjacently coupled fluid conduit sections of a self-propelled fluid distribution system.

It is a further object of the present invention to provide such a control system having improved sensitivity for maintaining conduit sections in closer alignment.

It is also an object of the invention to provide a control system which is based on digital circuitry for controlling the driver.

More specifically, it is an object of this invention to provide such a system in which Hall-effect sensors are used to sense the relative amount and direction of misalignment in adjacent conduit sections.

It is also an object to provide a control apparatus wherein a condition of alignment is sensed by actively operating sensors rather than by the lack of a sensed condition, such as the existence of a light beam or a magnetic field.

In accordance with these and other objects, the present invention is directed to a control apparatus for use in an irrigation system including first and second conduit sections pivotally joined at a set of adjacent ends and a selectively operable driver drivingly attached to at least one of the conduit sections adjacent the end thereof joined to the other conduit section for moving the conduit section in a forward direction. The control apparatus particularly includes a conduit misalignment indicator having a first indicating portion joinable to one of the conduit sections and a second indicating portion disposed adjacent the first portion and joinable to the other conduit section. The relative position of the first and second portions is directly relatable to the relative alignment of the two conduit sections. Further, Hall-effect sensor means mounted on the first and second portions are responsive to the relative positions of the portions for generating a pair of digital electrical sensor signals indicating, in combination, the relative alignment of the conduit sections. A circuit responds to the sensor signals for generating a control signal for initiating and terminating operation of the driver when the conduit sections are in lagging and leading, respectively, misalignment.

The specific embodiment of the present invention particularly includes a misalignment multiplier interposable each of the first and second portions and the associated conduit section ends. It may also include a pair of Hall-effect sensors mounted on one of the portions and a magnetic pole mounted on the other in such a way that both sensors sense the pole magnetic field when the indicator has a position indicating conduit section alignment.

These and additional objects and advantages of the present invention will be more clearly understood from a consideration of the drawings and the following detailed description of the preferred embodiment.

DETAILED DESCRIPTION OF THE INVENTION

Figure 1:
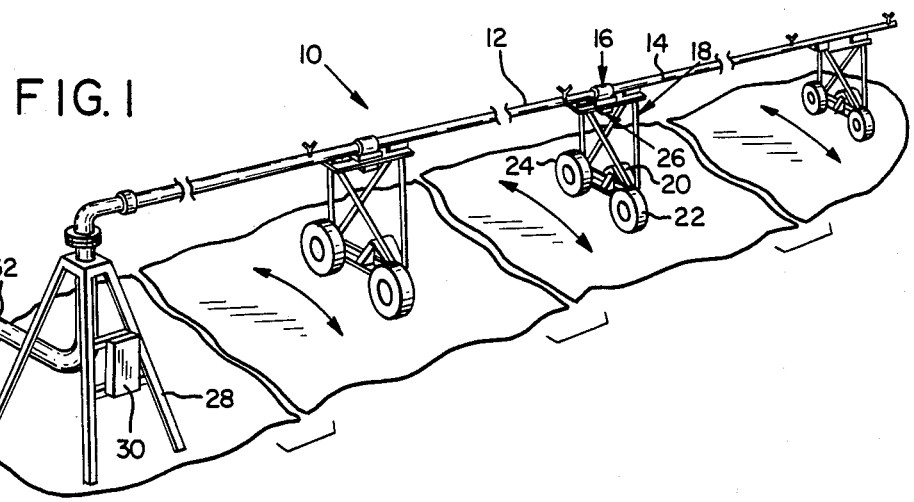
FIG. 1 is a perspective view of a self-propelled irrigation system including a control apparatus made in accordance with this invention.

Referring now to the drawings, and initially to FIG. 1, a self-propelled center-pivot-type irrigation system, is shown generally at 10. System 10 includes a plurality of conduit sections, such as sections 12, 14, which are pivotally joined at adjacent ends by a coupling 16. A self-propelled carriage or tower 18 supports the joined conduit section ends. Each tower 18 includes a selectively and reversibly operable motor 20 which is drivingly attached to a pair of wheels 22, 24.

Each tower 18 also includes an alignment control apparatus, shown generally at 26, made in conformance with this invention.

The string of conduit sections are pivotally attached to a central pivot tower 28 which also typically has a central control box 30 for providing power and overall controls to the individual control apparatus 26. Also, a water supply inlet conduit section 32 transfers pressurized water to the string of conduit sections for controlled distribution as the conduit sections travel about tower 28.

Figure 2:
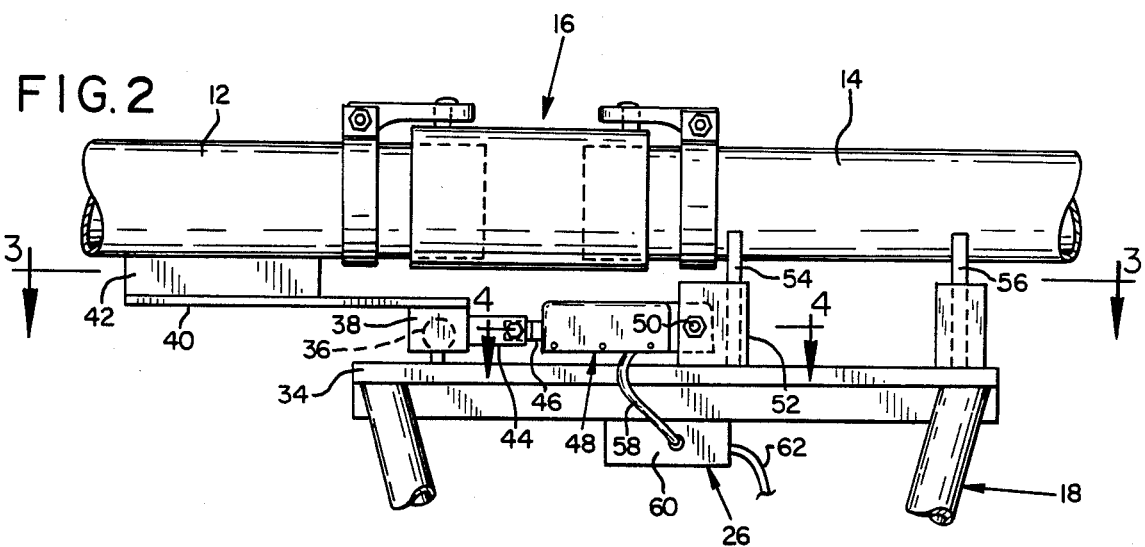
FIG. 2 is an enlarged side elevation of a portion of the system of FIG. 1 showing a control apparatus made according to the present invention connected to two adjacent conduit sections.
Figure 3:
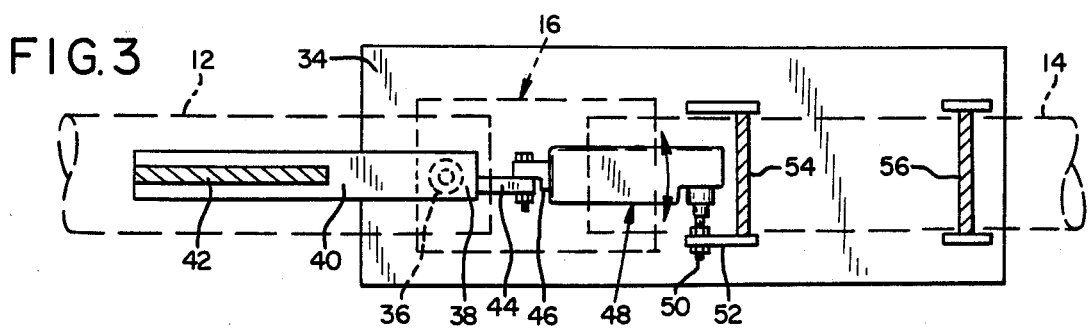
FIG. 3 is a cross-sectional top view of the control apparatus shown in FIG. 2 taken along line 3—3 in that figure.

Referring now particularly to FIGS. 2 and 3, additional structure associated with the joined conduit ends and control apparatus 26 will be discussed. Forming the top portion of tower 18 is a platform 34 on which is fixedly mounted a projecting ball 36. A complimentary socket 38 is supported on ball 36, the combination forming a ball and socket joint. Socket 38 is attached to a plate 40 which extends below and generally parallel with conduit 12, as shown. Plate 40 is fixedly attached to conduit 12 by a vertically extending plate 42. As can be seen, socket 38 is disposed just below the end of conduit 12.

Extending from the right edge of socket 38, FIGS. 2, 3, is a connecting member 44 which extends above platform 34 in the direction of conduit 14. Fixedly attached to member 44 through a nut and bolt connection is a bar 46, referred to as a base bar, which extends into what will be referred to as an alignment sensing housing 48. From the opposite end of housing 48 is a laterally extending rod 50 which is fixedly attached to a support plate 52 fixedly mounted on platform 34. Housing 48 is entirely supported by bar 46 and rod 50.

Plate 52 is also connected to a conduit support plate 54 which extends laterally under and is fixedly attached to conduit 14. A second, similarly mounted conduit support plate 56 is also attached to conduit 14 at a position on platform 34 which is spaced from plate 54.

Extending out of the bottom of housing 48 is an electrical cable 58 which extends into a tower control box 60, the contents of which will be described shortly. Extending from box 60 is another cable 62 which extends to a power supply (not shown), the pivot control box 30 and motor 20.

Figure 4:
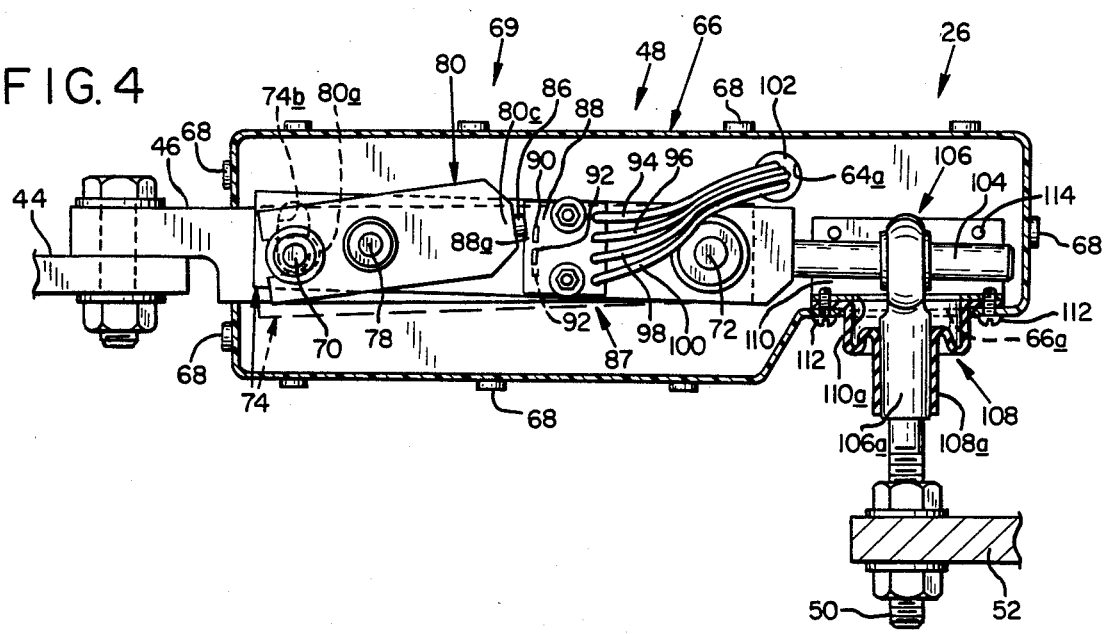
FIG. 4 is a further enlarged partial cross-sectional view of a portion of the apparatus of FIG. 2 taken along line 4—4 in that figure showing the aparatus in a misalignment-indication postion.
Figure 5:
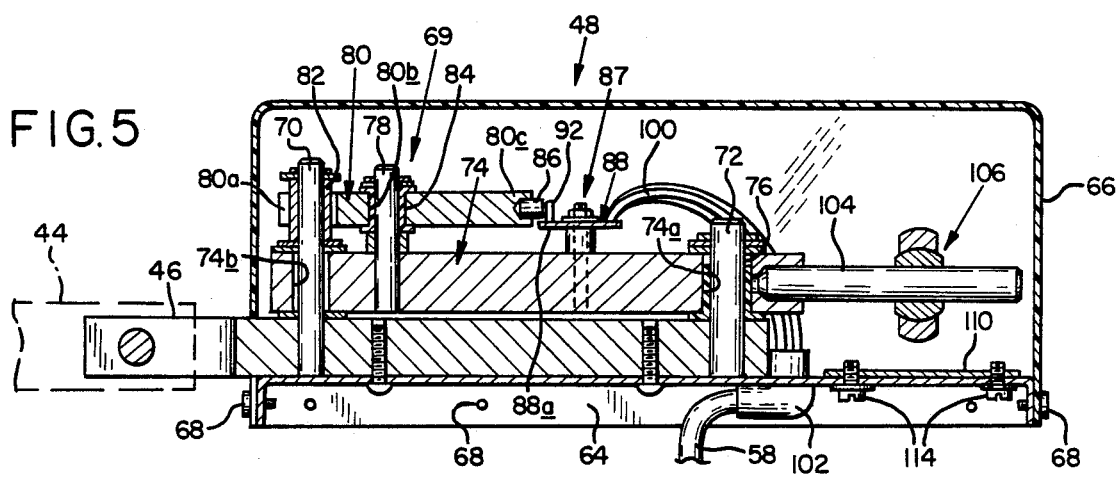
FIG. 5 is a cross-sectional view of the apparatus of FIG. 4 in an alignment-indication position taken along line 5—5 in that figure.

Referring now to FIGS. 4 and 5 in particular, housing 48, shown in cross section, includes a base plate 64 having a generally horizontal portion with downward extending edges. Attached to the downward extending edges of base 64 and forming above the base is a preferably clear plastic cover 66 which is attached to the base edges by screws, such as screw 68, as shown. Base 64 has an aperture 64a extending through it as shown in FIG. 4. Cover 66 has an opening 66a defined in the right end of the lower side as viewed in the same figure.

Bar 46, previously described, extends from the left edge of housing 48 onto the top of base 64 to which it is fixedly attached. Bar 46 is included in what is referred to generally as a misalignment indicator 69, which will now be described. Extending upwardly from bar 46, adjacent the inside left end of housing 48 is a pivot rod 70 fixedly attached to bar 46. Similarly, extending upwardly from the right end of bar 46 is another pivot rod 72, also fixedly attached to bar 46. Disposed above bar 46 is what will be referred to as a first pivoted bar 74. Bar 74 has vertical aperture 74a extending through its right-most end as seen in the figures. Aperture 74a is sized for receipt of a bushing 76. Bushing 76 and rod 72 cooperate to form a means pivotally joining bar 46 to bar 74 for relative pivoting of bar 74 in a substantially horizontal plane which is parallel with the plane of the view of FIG. 4.

Disposed at the opposite or left end of bar 74, as viewed in the figures, is a laterally extending elongate aperture 74b which is sized to freely receive rod 70 therethrough. Another pivot rod 78 extends vertically upwardly from bar 74 intermediate apertures 74a, 74b.

Disposed above bar 74 is a second pivoted bar 80. Bar 80 extends from above the left end of bar 74 to a position above and intermediate the ends of bar 74. Adjacent the left end of bar 80 is a slit 80a extending inwardly from the end of bar 80 for sliding receipt of a bushing 82. Pivot rod 70 and bushing 82 provide a connection whereby the left end of bar 80 is in effect tethered to base bar 46.

Further defined in bar 80 is a vertical aperture 80b sized for receipt of a bushing 84 which is disposed around pivot rod 78. Rod 78 and bushing 84 cooperate to form pivot means pivotally mounting bar 80 on bar 74, with bar 80 pivoting in a generally horizontal plane.

The right or distal end of bar 80 forms what is referred to as a first indicating portion 80c. A permanent magnet 86, forming part of a sensor device 87, is mounted on portion 80c to extend outwardly from the end thereof.

Mounted on the top side of bar 74, in an expanse of bar 74 located between pivot rod 78 and pivot rod 72, is a circuit board 88 having a top surface disposed just below the lower edge of magnet 86, as shown. Disposed on a front margin 88a of board 88 are a pair of Hall-effect sensors 90, 92 which are disposed side-by-side in a lateral configuration relative to bar 74. The expanse of bar 74 is also referred to herein as a second indicating portion. With the construction which has been described previously, bar 80 is pivotable relative to bar 74 about pivot rod 78. Thus, magnet 86, being mounted on bar 80 is also pivotable about rod 78. Sensors 90, 92, also referred to herein as sensor means, are disposed in such a manner that magnet 86 travels serially past them when it is pivoted about rod 78. Extending from circuit board 88 and connected to sensors 90, 92 are four conductors 94, 96, 98, 100 which extend down through an electrical plug 102 disposed in aperture 64a. Cable 58, containing these four conductors, extends out from plug 102. Sensors 90, 92 and conductors 94, 96, 98, 100 are also included in sensor device 87. The remaining mechanical members in housing 48, including bar 46 and rod 50 form misalignment indicator 69.

Extending out the right end of bar 74 is a cylindrical shaft 104 contained within housing 48. Slidingly mounted on shaft 104 is a coupling 106 having a neck 106a fixedly attached to rod 50. Coupling 106 is constructed in such a manner that it is slidable longitudinally along shaft 104, is twistable to a limited extent about the axis of rod 50, and is pivotable about the axis of shaft 104.

Disposed around neck 106a is a flexible diaphragm-type seal 108 having a collar 108a disposed around neck 106a. Seal 108 and coupling 106 extend through opening 66a, as shown. The margins of seal 108 are sandwiched between the inside surface of cover 66 adjacent opening 66a and a mounting plate 110 also having an opening 110a conforming with opening 66a. Plate 110 is held against seal 108 by screws such as screw 112. Further, plate 110 has a bend along its lower portion, thereby forming a general L-shape in the plate. This lower portion is fastened to base 64 by screws, such as screw 114.

It can therefore be seen that bar 74 at its right end is connected, i.e., tethered to conduit 14 through shaft 104, coupling 106, rod 50 and support plate 52.

The three bars 46, 74, 80 associated with indicator 69 are constructed in the preferred embodiment to be in parallel alignment when conduit sections 12, 14 are also in alignment. In this aligned position, indicating portion 80c confronts circuit board front margin 88a. Further, magnet 86 is positioned in line with the space between sensors 90, 92.

The bars are shown in FIG. 4 in the position they would have with conduit 14 (connected to bar 74) misaligned with respect to conduit 12 (connected to bar 46), so as to position bar 74 with such inclined upwardly with respect to bar 46 as these bars are depicted in FIG. 4 and progressing from the left end to the right end of bar 74 in the figure. Such relative pivoting of bar 74 with respect to bar 46 results in a lateral shifting of pivot rod 78 from the position of the rod when bars 74, 46 are in alignment, such shifting having been in an upward direction as the rod is pictured in FIG. 4. With such shifting having occurred in the position of rod 78 by reason of this misalignment of bars 74, 46, bar 80 swings to a misaligned position with respect to bar 74 (its left end being tethered through rod 70 to bar 46). The misalignment is with bar 80 inclining upwardly with respect to bar 74 as the bar is shown in FIG. 4 and progressing from the left end to the right end of bar 80. The construction described produces a greater inclination of bar 80 with respect to bar 74 then the inclination of bar 74 with respect to bar 46. The inclination produced shifts magnet 86 from a position in line with the space between sensors 90, 92 to a position where the magnet is to one side of these sensors.

With conduit 14 misaligned in the opposite direction with respect to conduit 12, bar 74 assumes an inclined direction with respect to bar 46 as shown by the dashed outline of bar 74 in FIG. 4. This results in a lateral displacement of rod 78 in an opposite direction to that just described, with swinging of magnet 86 to the other side of sensors 90, 92.

Figure 6:
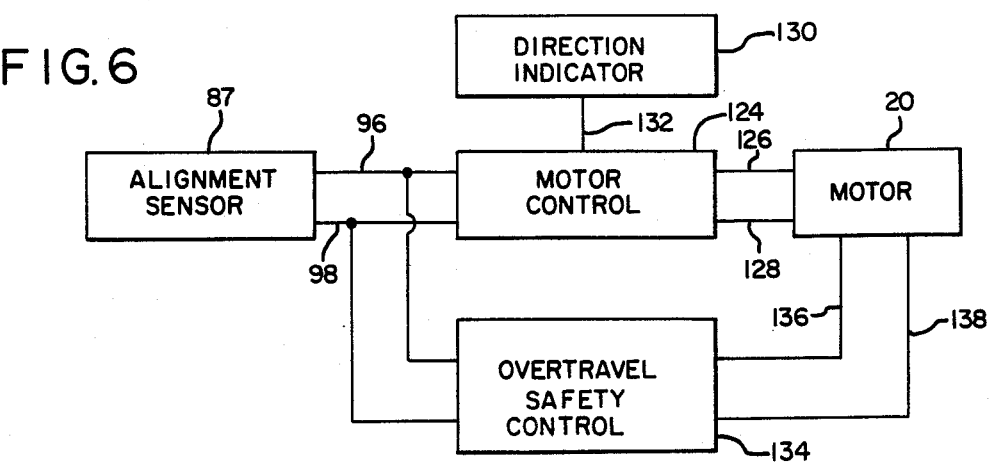
FIG. 6 is a block diagram of the alignment control circuit included in the apparatus of FIG. 2.

Referring now to FIG. 6, a block diagram of the circuitry associated with control apparatus 26 is shown. Sensor device 87, previously described is shown as an alignment sensor. For clarity of illustration, the ground and power supply conductors of the circuits have been omitted. Conductors 96, 98, are connected to Hall-effect sensors 90, 92, respectively, in device 87. These two conductors extend to a motor control circuit 124 which produces on a pair of output conductors 126, 128 a control signal which will be described in detail with respect to FIG. 7. A direction indicator circuit 130, also referred to herein as movement-direction-designating means, generates a direction signal 132. Motor control circuit 124 is responsive to direction signal 132 in generating the control signal transmitted on conductors 126, 128.

Also attached to conductors 96, 98 is an overtravel safety control circuit 134. Circuit 134, also referred to as stop means, is connected to motor 20 through conductors 136, 138. Circuits 124, 130, 134 are mounted in tower control box 60.

Figure 7:
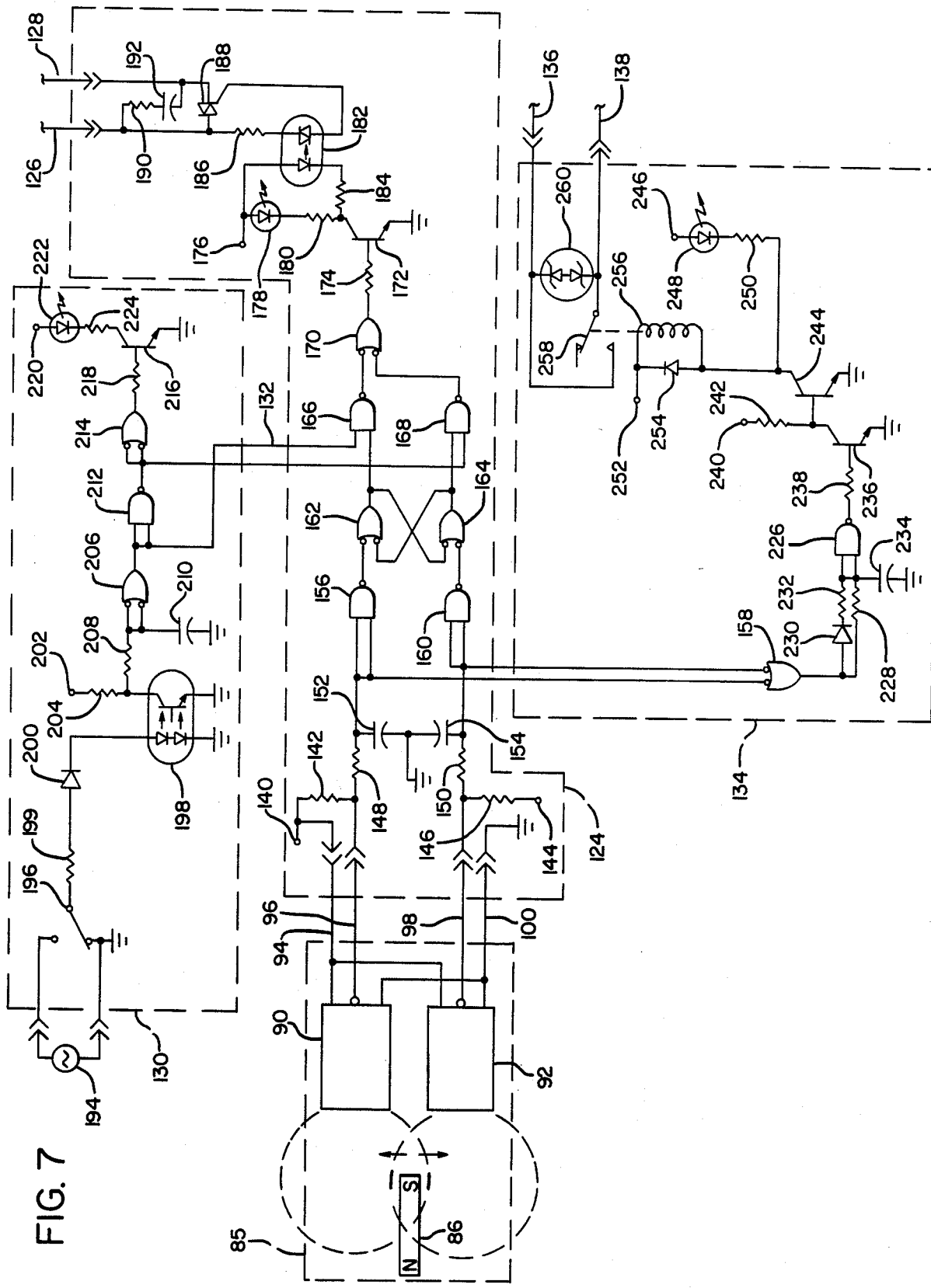
FIG. 7 is a schematic diagram of the circuit shown in FIG. 6.

Referring to FIG. 7, the details of the circuits shown in block form in FIG. 6 will now be described. Although the supply particular circuitry is not shown in the figure, the reference power supply used to generate a 10 volt DC source for the circuits now to be described is a conventional diode bridge the output of which is tied to ground through capacitors as is conventionally provided.

As described previously, conductors 94, 96, 98 and 100 are connected between sensor device 87 and motor control circuit 4. Conductor 94 is connected directly to the reference voltage at 140. Conductor 96 is indirectly connected to the same reference voltage through a 2.2K ohm resistor 142. Similarly, conductor 98 is connected to a reference voltage at 144 through another 2.2K ohm resistor 146. Conductor 100 is connected to chassis ground.

Conductors 96, 98 are also connected to ground through 100K ohm resistors 148, 150, respectively, in series with 0.01 microfarad capacitors 152, 154, respectively.

The following discussion referrs to NAND-gates, NOR-gates, and inverting-inpute NOR-gates. These terms are intended as simplified expressions for what are more properly referred to as positive-logic NAND-gates and negative-logic NOR-gates.

The junction between resistor 148 and capacitor 152 is connected to the input of an inverter (4011) 156 and an inverting input of a NOR-gate (4011) 158. Correspondingly, the junction between resistor 150 and capacitor 154 is connected to an inverter (4011) 160 as well as the other negative input to gate 158. The outputs of inverters 156, 160, go to inverting inputs of NOR-gates (4011) 162, 164, respectively. The output of each of these two NOR-gates is also tied to an inverting input of the other gate, as shown. Further, the outputs of gates 162, 164 are connected to an input of NAND-gates (4011) 166, 168, respectively. The outputs of these two NAND-gates are then input to the inverting inputs of NOR-gate (4011) 170.

The output of gate 170 is connected to the base of an NPN transistor (2N2222) 172 through a 10K ohm resistor 174. Transistor 172 is emitter-grounded with the collector connected to a reference voltage at 176 through an LED (TIL220) 178 in series with a 1K ohm resistor 180. Also connected between reference 176 and the collector of transistor 172 is the photodiode side of an optical isolator (MDC3011) 182 in series with a 510 ohm resistor 184. The triac side of optical isolator 182 is connected to motor conductor 126 through a 1.8K ohm resistor 186. The other side of optical isolator 182 is connected to the gate of a triac (SC1411)188. Triac 188 is connected between conductors 126 and 128 in parallel with the series combination of a 270 ohm resistor 190 and a 0.1 microfarad capacitor 192. Conductors 126, 128 are connected to relays associated with the driving circuit of motor 20.

The direction indicator circuit is shown in dashed outline at 130. A 120 volt rms, 60 Hz., power supply 194 is connected across a switch 196, one terminal of which is connected to ground. This switch is actually located in central control box 30 so that all towers can be controlled from a single source.

Switch 196 is connected to the photodiode side of another optical isolator (4N25) 198 through a 25K ohm resistor 199 and a diode (1N4002) 200, as shown. The cathode terminal of the photodiode side of optical isolator 198 is connected to chassis ground, as is the emitter of the associated phototransistor. The collector of the phototransistor in optical isolator 198 is connected to a reference voltage at 202 through a 51K ohm resistor 204. The phototransistor collector is also connected to both inverting inputs of a NOR-gate (4011) 206 through a 1K ohm resistor 208. The junction between resistor 208 and the inputs to gate 206 is connected to ground through a 10 microfarad capacitor 210. The output of gate 206 is input to inverter (4011) 212, the output of which is input to the inverting inputs of NOR-gate (4011) 214. The output of gate 206 is also input to gate 166. The output of inverter 212 is also input to gate 168.

The output of gate 214 is connected to the base of a common-emitter transistor (2N2222) 216 through a 10K ohm resistor 18. The collector of transistor 16 is connected to a reference voltage at 220 through an LED (TIL220) 222 in series with a 1K ohm resistor 224.

Overtravel safety control circuit 134 is shown in dashed outline in the lower portion of FIG. 7. Circuit 134 includes gate 158 which has previously been discussed. The output of gate 158 is connected to an inverter (4011) 226 through a parallel connection of a 10 megohm resistor 228 in parallel with the combination of a diode (1N4002) 230 in series with a 10K ohm resistor 232. The input to inverter 226 is also connected to ground through a 1 microfarad capacitor 234.

The output of inverter 226 is connected to the base of a common-emitter transistor (2N2222) 236 through a 51K ohm resistor 238. The collector of transistor 236 is connected to a voltage reference at 240 through a 5.1K ohm resistor 242. The collector of transistor 236 is also connected through the base of another common-emitter transistor (2N2222) 244. The collector of this transistor is connected to the reference voltage at 246 through an LED (TIL220) 248 in series with a 1K ohm resistor 250.

The collector of transistor 244 is further connected to a voltage reference at 252 through a reverse biased diode (1N4002) 254, which diode is in series with the winding of a solenoid (AZ1535-11-2) 256. Solenoid 256 controls a switch 258 which is normally in an open or non-contact position as shown. The other contact of switch 258 is connected to conductor 136. The base of switch 258 is connected to conductor 138. A metal oxide varister (V130-LAI) rated at 130 volt AC or 200 volt DC is connected in parallel with switch 258 between conductors 136, 138.

Operation

Irrigation system 10 is controlled generally from pivot tower 28 through control box 30. Thus, as was mentioned previously, although switch 196 described with reference to direction indicator circuit 130 is shown within that circuit in FIG. 7, the switch is actually disposed in control box 30 so that all towers may be controlled simultaneously.

As viewed from above in FIG. 1, system 10 may be operated in either a clockwise or a counterclockwise direction, depending on how motor 20 is wired to the power supply. For purposes of discussion, it will be assumed that a counterclockwise movement of system 10 is a forward movement. Switch 196 is connected to ground for operation in a forward direction. When it is connected to power supply 194, the system will move in the opposite or reverse direction. Further, it will be presumed that initially the conduits in system 10 are in alignment.

Discussing initially the operation of mechanical misalignment indicator 69, as has been stated previously, with conduits 12 and 14 in alignment, bars 48, 74 and 80 are parallel. In this configuration (illustrated in FIG. 7), magnet 86, provided by Permag-Sierra Corporation, Model SR-8522, is in line with the center spacing between sensors 90, 92. In this position both of the sensors sense the magnetic field provided by magnet 86.

Assuming further that control circuit 124 has initial states which provide that motor 20 is not operating, tower 18 will remain in its initial position until conduits 12, 14 are in approximately a 0.5° lagging misalignment. The approximate position of magnet 86 relative to sensor 90, 92 which represents this position is shown in the solid lines in FIG. 4. In this position, sensor 90 senses the field of magnet 86 but sensor 92 does not.

When a sensor is sensing the magnetic field, it produces an output having what is identified in the circuit as a low voltage or low binary state. Thus, initially, when magnet 86 was positioned intermediate the sensors, both sensors produced a low output. The low outputs are transmitted on conductors 96, 98 from sensors 90, 92, respectively, to the inputs of inverters 156, 160. These inverters then produce high outputs.

Since it was assumed that the motor was not operating initially, the output of gate 162 must have been high while the output of gate 164 was low. The actual output states of gates 162 and 164 are randomly set when the system is initially turned on. Since control apparatus 26 maintains conduit alignment within a certain range, regardless of the initial starting conditions, the system is automatically self-correcting.

Inverters 156 and 160 in combination with inverting-input NOR-gates 162 and 164, connected as shown provide a bistable flip-flop circuit. Thus, when the input to gate 160 goes high because the magnetic field is no longer sensed by sensor 92, its output goes low. This produces two low inputs at gate 164 which forces it to produce a high output. This high output is coupled with the high output of gate 156 to produce a low output from gate 162. As will be described shortly, when switch 196 is set for travel in a forward direction, the output of gate 206 in direction indicator circuit 130 is low. With both inputs to NAND-gate 166 being low, a high output is produced. Conversely, gate 168 has two high inputs received from gates 164 and 212, which produce thereby a low output.

As a result, gate 170 receives a high and a low input and produces a high output. This high output causes a chain reaction of events to occur which eventually turns motor 20 on. Transistor 172 is turned on. This switches optical isolator 182 into conduction, which in turn causes triac 188 to conduct. Triac 188 acts as a switch for motor 20. When it is conducting the motor is operating. Also, in this operating mode, LED 178 is lit indicating that the circuit is in a "motor-operating" condition.

As motor 20 operates, driving tower 18 in a forward direction, conduits 12 and 14 return to alignment and proceed into leading misalignment until a misalignment angle of approximately 0.5° is achieved. When alignment is reached, motor 20 continues to operate. This is because, as sensor 92 is influenced again by the magnetic field it changes from a high to a low output state. Thus, the output of NAND-gate 160 goes from low to high. But a high and low input to gate 164 still produces a high output so that the output of gates 162 and 164 do not change.

When sufficient leading misalignment is produced n the conduits, sensor 90 is removed from the influence of the magnetic field. When this happens, its output is changed to a high state. The output from sensor 92 remains low. In this situation gate 156 has a low output and gate 160 a high output. Gate 164, having high and low inputs, continues to produce a high output. However, gate 162, now also having high and low inputs, changes to a high output. This changes an input to gate 164 giving it two high inputs. So it is now driven into a low state. With the same low output from gate 206 and high output from gate 212 the outputs of gates 166 and 168 both go high. This produces a low at the output of gate 170. The low output from gate 170 then turns off transistor 172 and ultimately triac 188. With motor 20 not operating, tower 18 will now sit in its new position until it again achieves a lagging misalignment sufficient to turn motor 20 on again. This cycling continues until the desired irrigation has been accomplished.

Describing now the operation of direction indicator circuit 130, when switch 196 is grounded there is no current flowing in the diode side of optical isolator 198. In this condition the phototransistor portion is not conducting and the input to gate 206 is high. This results in a low output from gate 206 and a high output from gate 212. These were the states assumed in the previous discussion for forward operation. This also produces a low output from gate 214 which makes transistor 216 non-conductive. As a result, there is no visual indication from an LED which correspondingly indicates that the system is set for forward operation.

However, if gate 196 is set to contact the AC power supply, then during the positive half cycles of current flow, optical isolator 198 conducts. During these times the input to gate 206 is low. Capacitor 210 assures that this state will continue by holding the charge between pulses. It can be seen that the outputs from gates 206, 212 and 214 are produced opposite from those when switch 196 is grounded. In this case the output of 206 and 214 are high and the output of gate 212 is low.

A high output from gate 214 causes transistor 216 to conduct. LED 222 therefore conducts and emits light giving a visual indication that the system is in a reverse mode.

It will be recalled in the prior example describing the operation of motor control circuit 124 that when sensor 90 but not sensor 92 is sensing the magnetic field of magnet 86 a high level output was produced at gate 170 which turned motor 20 on. It will further be recalled that in this situation the outputs of gate 162 and 164 were low and high, respectively. In a reverse mode situation, the inputs to gate 166 are now a high from gate 206 and a low from gate 162. This produces a high output from gate 166. Similarly, the inputs to gate 168 from gates 164 and 212 are high and low respectively. The two high inputs into gate 170 produce a low output. This turns motor 20 off through transistor 172, optical isolator 182 and triac 188, as has been described previously.

As operation of the system continues, conduits 12 and 14 reach a lagging misalignment orientation. Now sensor 92 and not sensor 90 senses the field of magnet 86. So sensor 90 produces a high output where as sensor 92 produces a low output. As a result, the output of gate 156 is low and gate 160 is high. Just prior to the switching of the state of the output of sensor 90, the output of gate 164 is high. This coupled with a low output from gate 156 produces a high output from gate 162. These high outputs from gates 160, 162, produce a low output from gate 164.

Following the logic through the circuit, gate 166 has a high input from both gates 162 and 206, producing thereby a low output. Similarly, the inputs to gate 168 are both low producing thereby a high output. A high and low input to gate 170 produces a high output which results in the operation of motor 20. As was the case in the forward operating direction, motor 20 will continue to operate until the conduits go into what is now a leading misalignment with sensor 90 and not sensor 92 sensing the magnetic field of magnet 86. At this point, motor 20 will be turned off.

Referring now to overtravel safety control circuit 134, during normal operation either as has been described, one or both of sensors 90, 92 sense the magnetic field of magnet 86. This requires that a low voltage always exist on one or both of the inputs to gate 158. So long as at least one of the inputs is low, the output of gate 158 is high.

This high level is transmitted to inverter 226, producing a low voltage at the base of transistor 236. With the transistor not conducting, the collector stays high, holding base of transistor 244 high. With transistor 244 conducting, LED 248 conducts and emits light. This shows that circuit 124 is in normal operation. Also, solenoid 256 is holding switch 258 in a contacting position. This keeps motor 20 as well as the other motors associated with irrigation system 10 in operation. Varistor 260 protects the contacts of switch 258 from inductive kickback when the switch opens.

However, when an excessive misalignment occurs between conduits 12 and 14 for whatever reason, magnet 86 is moved beyond both sensors 90 and 92 such that neither of the two sensors sense the magnetic field. In this condition they both produce an output which is high. Two high inputs to gate 158 produce a low output.

Discussing now an important feature of our invention, the resistor capacitor network at the input of gate 226 provides for a delay in the operation of the gate. It will be recalled that during normal operation the input to gate 226 is high, meaning that a high voltage exists on capacitor 234. When excessive misalignment occurs and the output of gate 158 drops, the voltage on capacitor 234 is maintained for a period of approximately six seconds with gradual discharge occurring through resistor 226. If a power shortage occurs on the system and voltage drops at the output of gate 158, the overtravel safety circuit will not respond unless it lasts more than six seconds.

When voltage decay has occurred sufficiently to lower the input voltage to gate 226, it produces a high output which causes transistor 236 to conduct. This drops the voltage on its collector and also the base of transistor 244, turning this latter transistor off. As a result, LED 248 no longer conducts and therefore does not emit light. Switch 258 now opens. When this occurs, a relay (not shown) associated with motor 20 which normally provides power to motors 20 is released. This causes a break in the power to the motors and irrigation system 10 is shut down. It is then necessary to correct whatever problem caused the excessive misalignment and realign the conduit sections within the tolerances allowed by the system for normal operation.

It can be seen that a control apparatus as has been described with respect to the foregoing preferred embodiment has several advantages. First, the multiplication of the conduit misalignment angle provided by misalignment indicator 69 makes it possible to maintain the conduit sections within much closer tolerances. Even though the Hall-effect sensors have a minimum space requirement, the sensitivity of the system is not limited by their requisite size. Further, with the angle multiplier provided by our invention, it is possible to establish a significantly smaller allowable angle of misalignment between the conduit sections.

Our invention also provides sensors which actively sense during normal operation. If either or both sensors were to malfunction for any reason, there would be an early indication of excessive misalignment in the conduit sections which would safely bring the system to a halt. The control circuitry provided also a single pair of signals for normal operation control, for direction indication and for excessive misalignment indication. Further, it can be seen that with active magnetic field sensing rather than with mechanical transducers or shielding of light sources, debris and contaminants that may exist in the environment of the sensors do not affect its operation.

An overtravel safety control system having a time delay circuit also allows for momentary power failures to occur without affecting operation of the system. Control apparatus 26 also provides for simplified direction-of-travel control. The direction-indicating signal is automatically incorporated in the control circuit for properly initiating and terminating operation of the associated motor.

While the invention has been particularly shown and described with reference to the foregoing preferred embodiment, it will be understood by those skilled in the art that other changes in form and detail may be made therein without departing from the spirit and scope of the invention as defined in the following claims.

It is claimed and desired to be secured by Letters Patent:

1. A control apparatus for an irrigation system comprising fluid distribution means including first and second conduit sections pivotally joined at a set of adjacent ends, and selectively operable drive means supporting at least one of the conduit sections adjacent said adjacent ends for moving the conduit section in a forward direction, said apparatus comprising conduit misalignment indicator means including a first indicating portion operatively connect to one of the conduit sections and a second indicating portion disposed adjacent said first portion and operatively connected to the other conduit section, the relative position of said first and second portions being directly relatable to the relative alignment of the two conduit sections, Hall-effect sensor means mounted on said first and second portions, said sensor means being responsive to the relative position of said portions for generating at least a pair of digital electrical sensor signals indicating, in combination, the relative alignment of the conduit sections, said sensor means including magnetic pole means mounted on one of said portions and a pair of Hall-effect sensors generating the sensor signals mounted on the other portion, said sensors being disposed for serial travel relative to said pole means when said indicating portions move in response to relative conduit section movement, said sensors being disposed in such a manner that both sensors sense the pole means' magnetic field when the indicator means has a position indicating conduit section alignment, and circuit means responsive to the sensor signals for generating a control signal for initiating operation of said drive means when the conduit sections are in lagging misalignment.

2. The apparatus of claim 1 wherein said circuit means includes flip-flop means responsive to the sensor signals for generating two misalignment-indicating signals which are mutually inverse when at least one of said sensors sense the pole means' magnetic field.

3. The apparatus of claim 1, wherein the sensor signals have additional relative logic states indicative of excessive misalignment of the conduit sections and which apparatus further includes stop means connectable to the drive means for stopping the drive means in response to the excessive-misalignment-indicating logic states of the sensor signals, said stop means including time delay means for delaying the time of stopping the drive means a known period of time after transition of the sensor signals to the excessive-misalignment-indicating logic states.

4. The apparatus of claim 1, wherein said misalignment indicator means includes multiplier means operatively interposed between the first and second indicating portions, said multiplier means comprising a base bar connected to one conduit section to extend in the direction of the conduit section, a first pivoted bar pivotally mounted intermediate its ends on said base bar for pivoting in a substantially horizontal direction and having one end tethered to the other conduit section so that on the conduit sections moving out of alignment the opposite end of the pivoted bar is angularly displaced relative to the base bar, and a second pivoted bar pivotally mounted intermediate its ends on the first pivoted bar at a point remote from the pivot mounting of the first pivoted bar on the base bar, said second pivoted bar having an end that is tethered to the base bar and an opposite end located over an expanse of the first pivoted bar which is angularly displaced relative to the first pivoted bar with angular displacement of the first pivoted bar relative to said base bar, said opposite end of said second pivoted bar and said expanse of the first pivoted bar constituting said indicating portions in the misalignment indicator means.

5. An irrigation system apparatus comprising fluid distribution means including first and second conduit sections pivotally joined at a set of adjacent ends, and selectively operable drive means supporting at least one of the conduit sections adjacent said adjacent ends for moving the conduit section in a forward direction,
conduit misalignment multiplier means comprising a base bar connected to one conduit section to extend in the direction of the conduit section, a first pivoted bar pivotally mounted intermediate its ends on said base bar for pivoting in a substantially horizontal direction and having one end tethered to the other conduit section so that on the conduit section moving out of alignment the opposite end of the pivoted bar is angularly displaced relative to the base bar, and a second pivoted bar pivotally mounted intermediate its ends on said first pivoted bar at a point remote from the pivot mounting of the first pivoted bar on the base bar, said second pivoted bar having an end that is tethered to the base bar and an opposite end located over an expanse of the first pivoted bar which is angularly displaced relative to the first pivoted bar with angular displacement of the first pivoted bar relative to said base bar,
sensor means mounted on and responsive to the relative positions of said opposite end of said second pivoted bar and said expanse of said first pivoted bar for generating electrical sensor signals indicating the relative alignment of the first and second conduit sections, and
circuit means responsive to the sensor signals for intitiating operation of said drive means when the conduit sections are in lagging misalignment.

6. A control apparatus for an irrigation system comprising fluid distribution means including first and second conduit sections pivotally joined at a set of adjacent ends, and selectively operable drive means supporting at least one of the conduit sections adjacent said adjacent ends for moving the conduit section in a forward direction, said apparatus comprising,
conduit misalignment multiplier means comprising a base bar connected to one conduit section to extend in the direction of the conduit section, a first pivoted bar pivotally mounted intermediate its ends on said base bar for pivoting in a substantially horizontal direction and having one end tethered to the other conduit section so that on the conduit section moving out of alignment, the opposite end of the pivoted bar is angularly displaced relative to the base bar, and a second pivoted bar pivotally mounted intermediate its ends on the first pivoted bar at a point remote from the pivot mounting of the first pivoted bar on the base bar, said second pivoted bar having an end that is tethered to the base bar and an opposite end located over an expanse of the first pivoted bar which is angularly displaced relative to the first pivoted bar with angular displacement of the first pivoted bar relative to said base bar, said opposite end of said second pivoted bar and said expanse constituting indicating portions in the multiplier means,
Hall-effect sensor means responsive to the relative position of said indicating portions for generating digital sensor signals indicating, in combination, the relative alignment of the conduit sections, said sensor means including magnetic pole means mounted on one of said indicating portions and a pair of Hall-effect sensors mounted on the other indicating portion, said sensors being disposed for serial travel relative to said pole means when said indicating portions move in response to relative conduit section movement, said sensors being disposed in such a manner that both sensors sense the pole means' magnetic field when said two indicating portions have relative positions indicating conduit section alignment, and
circuit means for generating a control signal for initiating operation of said drive means when the conduit sections are in lagging misalignment and terminating operation of said drive means when the conduit sections are in leading misalignment, said circuit means including flip-flop means responsive to the sensor signals for generating two misalignment-indicating signals which are mutually inverse when at least one of said sensors sense the pole means' magnetic field.

* * * * *